United States Patent
Ichinose et al.

(10) Patent No.: US 8,265,860 B2
(45) Date of Patent: Sep. 11, 2012

(54) STOP-START CONTROL APPARATUS FOR INTERNAL COMBUSTION ENGINE

(75) Inventors: Hiroki Ichinose, Fujinomiya (JP); Takayuki Otsuka, Susono (JP); Rentaro Kuroki, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 166 days.

(21) Appl. No.: 12/518,004

(22) PCT Filed: May 12, 2008

(86) PCT No.: PCT/JP2008/058736
§ 371 (c)(1),
(2), (4) Date: Aug. 10, 2009

(87) PCT Pub. No.: WO2009/139040
PCT Pub. Date: Nov. 19, 2009

(65) Prior Publication Data
US 2011/0246046 A1 Oct. 6, 2011

(51) Int. Cl.
*G06F 19/00* (2006.01)
*F02D 17/00* (2006.01)
*F02D 29/02* (2006.01)

(52) U.S. Cl. .......... 701/113; 123/179.4; 123/179.5; 123/179.16; 701/112

(58) Field of Classification Search .... 123/179.3–179.5, 123/179.16, 491; 701/101–103, 112, 113; 903/905
See application file for complete search history.

(56) References Cited

U.S. PATENT DOCUMENTS

| | | | |
|---|---|---|---|
| 7,051,693 B2 * | 5/2006 | Tetsuno et al. | 123/179.5 |
| 7,461,621 B2 * | 12/2008 | Ota et al. | 123/179.4 |
| 7,461,622 B2 * | 12/2008 | Maemura et al. | 123/179.5 |
| 8,036,817 B2 * | 10/2011 | Ota et al. | 701/113 |
| 2003/0041830 A1 | 3/2003 | Sugiura et al. | |
| 2003/0041831 A1 | 3/2003 | Aoki et al. | |
| 2005/0228575 A1 | 10/2005 | Murakami et al. | |
| 2009/0037085 A1 * | 2/2009 | Kojima | 701/113 |

FOREIGN PATENT DOCUMENTS

| | | |
|---|---|---|
| JP | 60-152039 U | 10/1985 |
| JP | 2002-276411 A | 9/2002 |
| JP | 2003-65104 A | 3/2003 |
| JP | 2003-65105 A | 3/2003 |
| JP | 2003-065191 A | 3/2003 |
| JP | 2005-030237 A | 2/2005 |
| JP | 2005-155362 A | 6/2005 |
| JP | 2005-248967 A | 9/2005 |
| JP | 2005299445 A | 10/2005 |

(Continued)

*Primary Examiner* — Willis R Wolfe, Jr.
(74) *Attorney, Agent, or Firm* — Sughrue Mion, PLLC (57) ABSTRACT

The stop-start control apparatus (20) is applied to the spark ignition type internal combustion engine (1), stops the internal combustion engine 1 in a case that a prescribed stop condition is fulfilled, and restarts the internal combustion engine (1) in a case that a prescribed restart condition is fulfilled. The control apparatus cuts spark ignition for the internal combustion engine 1 in response to the fulfillment of the stop condition, and carries on fuel supply to the internal combustion engine (1). When a restart condition is fulfilled after the fulfillment of a stop condition and prior to a complete stop of the internal combustion engine (1), the control apparatus restarts the internal combustion engine (1) by resuming spark ignition for the internal combustion engine (1) in order that fuel supplied after the fulfillment of the stop condition burns.

6 Claims, 6 Drawing Sheets

FOREIGN PATENT DOCUMENTS

| | | | | |
|---|---|---|---|---|
| JP | 2006283559 A | * | 10/2006 | .................... 701/113 |
| JP | 2006283660 A | * | 10/2006 | .................... 701/113 |
| JP | 2007-023815 A | | 2/2007 | |
| JP | 2007-198308 A | | 8/2007 | |
| JP | 2007-315316 A | | 12/2007 | |

* cited by examiner

STOP-START CONTROL APPARATUS FOR INTERNAL COMBUSTION ENGINE

TECHNICAL FIELD

The present invention relates to a stop-start control apparatus for an internal combustion engine which is applied to a spark ignition internal combustion engine and stops and restarts the internal combustion engine automatically.

BACKGROUND ART

With regard to an internal combustion engine mounted as a running power source for a vehicle, a stop-start control apparatus is widely known which stops an internal combustion engine when a stop condition such as when a vehicle stops is fulfilled, and restarts it from its stopped condition when a restart condition is fulfilled in order to reduce amount of fuel consumption and amount of exhaust gas or the like in an idling operation. For example, as such a type of control apparatus, one restarts an internal combustion engine by making fuel injected into a cylinder in expansion stroke in a case that a restart request is made during an automatic stop operation period, thereby to making fuel be ignited and combusted, and further making fuel injected into a cylinder in compression stroke, thereby to making fuel ignited and combusted (Patent document 1). Furthermore, another restarts an internal combustion engine by making fuel filled in a cylinder in a stop process of an internal combustion engine and making the fuel ignited and combusted after the engine comes to a complete stop (Patent document 2).
Patent document 1: JP 2005-155362-A
Patent document 2: JP 2005-30237-A

SUMMARY OF INVENTION

Technical Problem

The control apparatus of the patent document 1 judges in a stop process of an internal combustion engine whether a restart condition is fulfilled, and then makes fuel injected into a prescribed cylinder. And thus, if a timing of the judgment delays, a chance of injecting fuel might be missed in accordance with a degree of reduced engine rotation number of the internal combustion engine. In this case, it is necessary to make the internal combustion engine come to a complete stop and thereafter to restart it. Therefore, drivability of vehicle might be degraded. Furthermore, the control apparatus of the patent document 2 is not one which restarts an internal combustion engine in a stop process of an internal combustion prior to coming to a complete stop.

In this circumstance, it is an object of the present invention to provide a stop-start control apparatus for an internal combustion engine capable of enhancing the success possibility of restart in a case that a restart condition is fulfilled in a stop process of an internal combustion engine.

Solution to Problem

The stop-start control apparatus of the present invention is applied to a spark ignition internal combustion engine. The stop-start control apparatus stops the internal combustion engine in a case that a prescribed stop condition is fulfilled, and restarts the internal combustion engine in a case that a prescribed restart condition is fulfilled. The stop-start control apparatus includes a stop control device which cuts spark ignition for the internal combustion engine in response to the fulfillment of the stop condition, and carries on fuel supply to the internal combustion engine; and a restart control device which resumes spark ignition for the internal combustion engine in such a manner that fuel burns which is supplied after the fulfillment of the stop condition, in a case that a restart condition is fulfilled after the fulfillment of the stop condition and prior to a complete stop of the internal combustion engine. Thus, the above problem is solved.

According to the control apparatus, fuel supply is done in a condition where spark ignition is cut after the fulfillment of the stop condition, regardless of fulfillment or non-fulfillment of a restart condition. Therefore, when a restart condition is fulfilled in a stop process after the fulfillment of a stop condition and prior to coming to a complete stop, a restart can be done promptly by resuming spark ignition without supplying fuel after the fulfillment of a restart condition, thereby to making fuel ignited and combusted. It is less likely in the embodiment to miss a chance of restart than in the case that fuel is supplied after the fulfillment of a restart condition and then ignited and combusted. Thus, the success possibility of restart in the case that a restart condition is fulfilled in a stop process of an internal combustion engine can be improved.

In an aspect of the stop-start control apparatus of the present invention, the internal combustion engine is provided with a throttle valve capable of regulating amount of air supplied to the internal combustion engine by varying opening thereof, and the stop-start control apparatus may further include a throttle valve control device which controls an opening of the throttle valve to an opening side in such a manner that amount of supplied air is increased more than that prior to the fulfillment of the restart condition, in a case that the restart condition is fulfilled after the fulfillment of the stop condition and prior to a complete stop of the internal combustion engine. According to this aspect, more increased amount of air is supplied after the fulfillment of the restart condition than that prior to fulfillment thereof. Thus, shortage of air amount in a try of restart can be resolved. Therefore, the condition of ignited combustion becomes well after spark ignition is resumed, and thus the success possibility of restart is further improved. In this aspect, the throttle valve control device may control an opening of the throttle valve to a closing side in such a manner that amount of supplied air is reduced less than that prior to the fulfillment thereof, in a case that the stop condition is fulfilled. In this case, amount of supplied air is reduced less than that prior to the fulfillment of the stop condition. Thus, fluctuation of torque is suppressed by a reaction force of the air. Therefore, vibration in a stop process can be reduced. Furthermore, even when a restart condition is not fulfilled in a stop process, a process to a complete stop progresses promptly. Therefore, emission of fuel supplied after the fulfillment of a stop condition to outside of the engine can be suppressed.

In an aspect of the stop-start control apparatus of the present invention, the internal combustion engine is provided with a starter employing a motor as a drive source; and while keeping the starter to operate, the restart control device may resume spark ignition for the internal combustion engine, in a case that an engine rotation number of the internal combustion engine at a time when the restart condition is fulfilled after the fulfillment of the stop condition and prior to a complete stop of the internal combustion engine is at or lower than a prescribed value. Since the lower is the engine rotation number the more shortage is caused in torque obtained by ignited combustion, it gets harder to restart an internal combustion engine in a stop process. According to this aspect, a try of restart can be done with enough torque with the assist of a starter, in a case that the engine rotation number is at or lower than a prescribed value. Therefore, restart surely goes well.

In an aspect of the stop-start control apparatus of the present invention, the internal combustion engine is configured as a four stroke cycle engine including a plurality of cylinders, and is configured to start spark ignition at a cylinder stopped in a prescribed stroke, in restarting the internal combustion engine after it has comes to a complete stop, and the stop control device may identify a cylinder stopped in the prescribed stroke from among the plurality of cylinders, carry on fuel supply up to the identified cylinder from a time when the stop condition is fulfilled, and cut subsequent fuel supply until a complete stop of the internal combustion engine. In a case of the internal combustion engine in which spark ignition is started at a cylinder stopped in a prescribed stroke (ex. in compression stroke or in expansion stroke) in restarting after a complete stop, if fuel supply is carried on until a complete stop in a case that the engine comes to a complete stop without fulfillment of a restart condition in a stop process, fuel supplied to other cylinders goes to waste after fuel is supplied to a cylinder stopped in a prescribed stroke. According to this aspect, a cylinder stopped in a prescribed stroke is identified, fuel supply is carried on up to the identified cylinder, and subsequent fuel supply is cut until a complete stop. Accordingly, waste of fuel supply can be avoided, and thus degradation of fuel consumption can be prevented.

In an aspect of the stop-start control apparatus of the present invention, the internal combustion engine is configured as a four stroke cycle engine including a plurality of cylinders, and the restart control device may resume spark ignition at a cylinder which is in compression stroke at a time when the restart condition is fulfilled, in a case that the restart condition is fulfilled after the fulfillment of the stop condition and prior to a complete stop of the internal combustion engine. According to this aspect, after the fulfillment of the restart condition, spark ignition is started at a cylinder which is in compression stroke. Thus, a prompt restart can be realized.

Advantageous Effects of Invention

As described above, according to the present invention, a restart can be done promptly after the fulfillment of a restart condition in a stop process by resuming spark ignition without supplying fuel. Thus, the control apparatus is less likely to miss a chance of restart than one which makes fuel supplied after a restart condition is fulfilled and then ignited and combusted. Thus, the success possibility of restart in a case that a restart condition is fulfilled in a stop process of an internal combustion engine can be improved.

DESCRIPTION OF EMBODIMENTS

Figure 1:
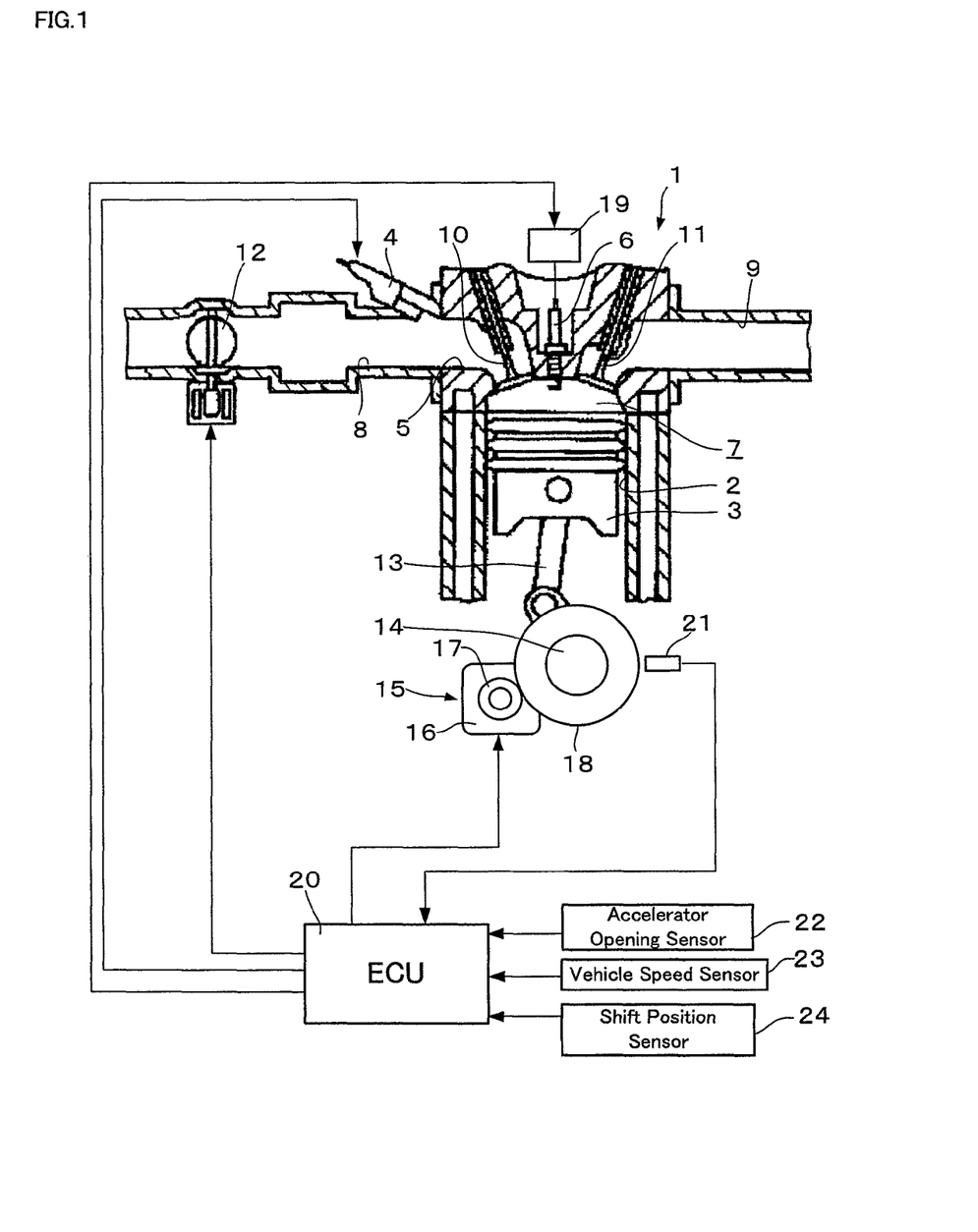
FIG. 1 is a view showing an internal combustion engine to which a stop-start control apparatus according to an embodiment of the present invention is applied.

FIG. 1 shows an internal combustion engine to which a stop-start control apparatus according to an embodiment of the present invention is applied. The internal combustion engine 1 is mounted as a running power source in a vehicle (not shown). In FIG. 1, the internal combustion engine 1 is configured as a four stroke cycle engine, and includes four cylinders 2 aligned in one direction. Although only a single cylinder 2 is shown in FIG. 1, other cylinders 2 have a same structure. In order to distinguish these cylinders 2 from each other, a cylinder number of #1 to #4 may be given to the cylinders 2 from one end toward the other end of their aligned direction in the following description and drawings.

Phase of a piston 3 in each cylinder 2 is shifted in accordance with a number and a layout of cylinders 2. Since the internal combustion engine 1 is an inline four cylinder type, the phases of the pistons 3 are shifted by 180° CA in terms of crank angle. Thus, the piston 3 of any one cylinder 2 of the four cylinders 2 is always in intake stroke, whereas the piston 3 of any other one cylinder 2 is always in expansion stroke. The internal combustion engine 1 is also configured as a port injection type spark ignition internal combustion engine, in which mixed gas is introduced into each cylinder 2 through injection of fuel into an intake port 5 from a fuel injection valve 4, and the mixed gas is ignited through spark of an ignition plug 6. The sequence of ignition at each cylinder 2 is set #1, #3, #4, and #2 in this order. Fuel injected from the fuel injection valve 4 is gasoline, for example. The internal combustion engine 1 is further provided with a combustion chamber 7, an intake valve 10 and an exhaust valve 11 which respectively opens and closes an intake passage 8 and an exhaust passage 9, a throttle valve 12 which regulates amount of air from the intake passage 8, and a connecting rod 13 which transmits reciprocal motions of the piston 3 to a crankshaft 14 in a form of rotational movements. These structures may be same as those in a well-known internal combustion engine.

The internal combustion engine 1 is provided with a starter 15 as a starting device for making the engine 1 start. The starter 15 is a well known one which employs a motor 16 as a drive source and transmits rotation of the motor 16 through a speed reduction gear mechanism 17 to a ring gear 18, which rotates integrally with the crankshaft 14. Additionally, the speed reduction gear mechanism 17 incorporates a one-way clutch which allows for transmission of rotations from the motor 16 to the crankshaft 14 but blocks transmission of rotations from the crankshaft 14 to the motor 16.

The operating condition of the internal combustion engine 1 is controlled by an engine control unit (ECU) 20. ECU 20 is configured as a computer including a microprocessor and peripheral devices, such as RAM and ROM, which are required for the operation thereof. ECU 20 executes various processes required to control the operating condition of the internal combustion engine 1 in accordance with programs stored in the ROM. As an example, ECU 20 detects amount of intake air or amount of air-fuel ratio from output signals of various sensors, and controls amount of fuel injected from the fuel injection valve 4 in such a manner that a prescribed air-fuel ratio is achieved. ECU 20 also controls the execution of spark ignition by making an ignition circuit 19 for driving the ignition plug 6 to operate. As sensors referred by ECU 20, a crank-angle sensor 21 which outputs a signal corresponding to a rotary position (crank angle) of the crankshaft 14, an accelerator opening sensor 22 which detects an opening of an accelerator pedal, a vehicle speed sensor 23 which detects a vehicle speed of a vehicle which mounts the internal combustion engine 1, and a shift position sensor 24 which detects a gear stage (a shift position) of a transmission provided on the vehicle, and the like are provided. Additionally, a brake pedal sensor which detects an operation of a brake pedal or the like is provided, however; these are omitted in the figure. ECU 20 can also control an opening of the throttle valve 12 by operating the throttle valve 12.

ECU 20 executes a so-called idling stop control for the internal combustion engine 1. In the idling stop control, the internal combustion engine 1 is stopped in a case that a prescribed stop condition such as when a vehicle stops is fulfilled, and is restarted from its stopped condition in a case that a prescribed restart condition is fulfilled. The stop condition and the restart condition may be set in a similar manner to known techniques with regard to idling stop control. For example, ECU 20 determines that a stop condition is fulfilled when a vehicle stops and the engine rotation number (rotation speed) reaches an idling rotation number, and outputs a stop command to the internal combustion engine 1. In this case, the determination whether or not the stop condition is fulfilled is done on the basis of signals from the crank-angle sensor 21 and the vehicle speed sensor 23. ECU 20 also determines that a restart condition is fulfilled when the accelerator pedal is pushed down or the brake pedal is released in a case that the vehicle is in a stopped condition and a shift position of the transmission is at a drive range, and outputs a restart command to the internal combustion engine 1. In this case, the determination whether or not the restart condition is fulfilled is done on the basis of output signals from the accelerator opening sensor 22 and the shift position sensor 24 or an output signal from a brake pedal sensor not shown in the figure. Various parameters such as an engine temperature and a condition of a battery or the like may be added in determining whether or not a stop condition or a restart condition is fulfilled. However, since these are known techniques, their detailed description will be omitted.

The embodiment is characterized by controls, which are executed in idling stop control and in the case that a restart condition is fulfilled after the fulfillment of a stop condition and prior to a complete stop of the internal combustion engine 1. At first, control examples according to the embodiment will be described with reference to FIG. 2 and FIG. 3. These figures show temporal variations of a crank angle and an engine rotation number NE of the internal combustion engine 1, an opening of the throttle valve 12, and the operating condition of the starter 15. Along with these, the figures show strokes in each cylinder 2 (#1~#4) and execution timings of fuel supply (fuel injection) and spark ignition for each cylinder 2.

Figure 2:
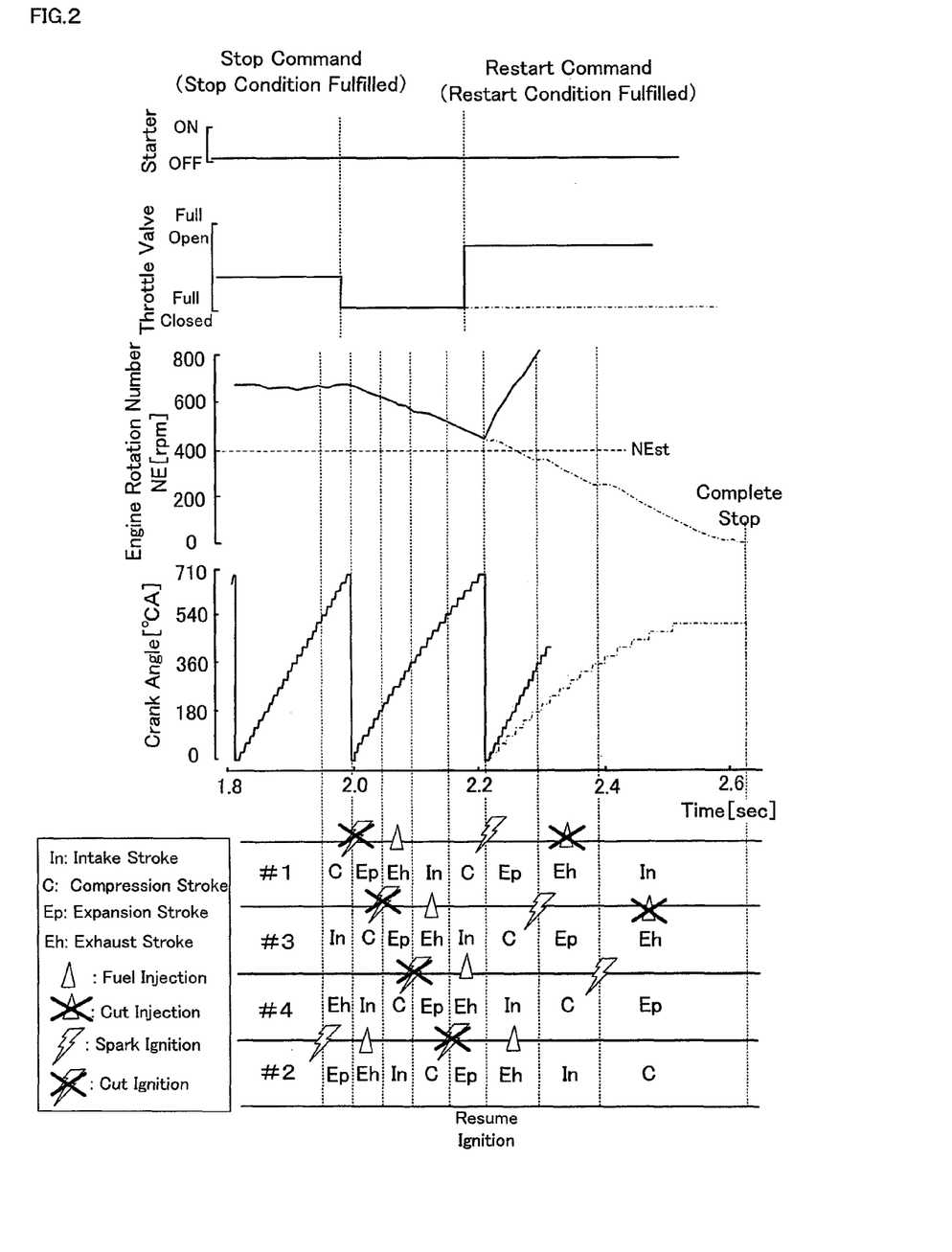
FIG. 2 is a timing chart showing an example of controlled result according to the embodiment of the present invention.

FIG. 2 is a timing chart showing an example of controlled result according to the embodiment. As shown in the figure, when a stop condition is fulfilled and then a stop command is outputted, spark ignition is cut immediately after the command while fuel injection is carried on. Concurrently therewith, an opening of the throttle valve 12 is controlled to a closing side. In this case, the throttle valve 12 is controlled to a nearly full-closed condition. Although fuel supply is carried on, spark ignition is cut and no combustion is done in the cylinder 2, and thus the engine rotation number NE decreases gradually to a complete stop. Since the throttle valve 12 is controlled to a nearly full-closed condition during this period, fluctuation of engine rotation number NE is suppressed. In a case that no restart command is made in a stop process to a complete stop, spark ignition is cut and fuel injection is carried on up to a cylinder 2 to be stopped in compression stroke (the cylinder #2, in this example), as shown by a dash-dotted line, so that the engine comes to a complete stop. Fuel injection is carried on until a cylinder to be stopped in compression stroke, in order to start spark ignition at a cylinder in a compressed state in restarting after a complete stop and thereby to avoiding wasteful fuel injection.

On the other hand, in a case that a restart command is outputted in a stop process, the opening of the throttle valve 12 is immediately controlled to a further opening side than that prior to the output of command, so that amount of supplied air is increased. Then, spark ignition is resumed at a cylinder 2 which is in compression stroke at the time of the restart command (the cylinder #1, in this example). Since fuel injection is done after the stop command is made, the mixed gas in the cylinder 2 containing the fuel burns when spark ignition is resumed. Thus, the engine rotation number NE rises as shown by a solid line; and a restart goes well. In the example of FIG. 2, torque required for restart can be retained only through spark ignition, even when the engine rotation number NE at the time of the restart command exceeds a threshold NEst, over which it gets hard to restart the engine only through spark ignition. Thus, the starter 15 is not in operation at the restart.

Figure 3:
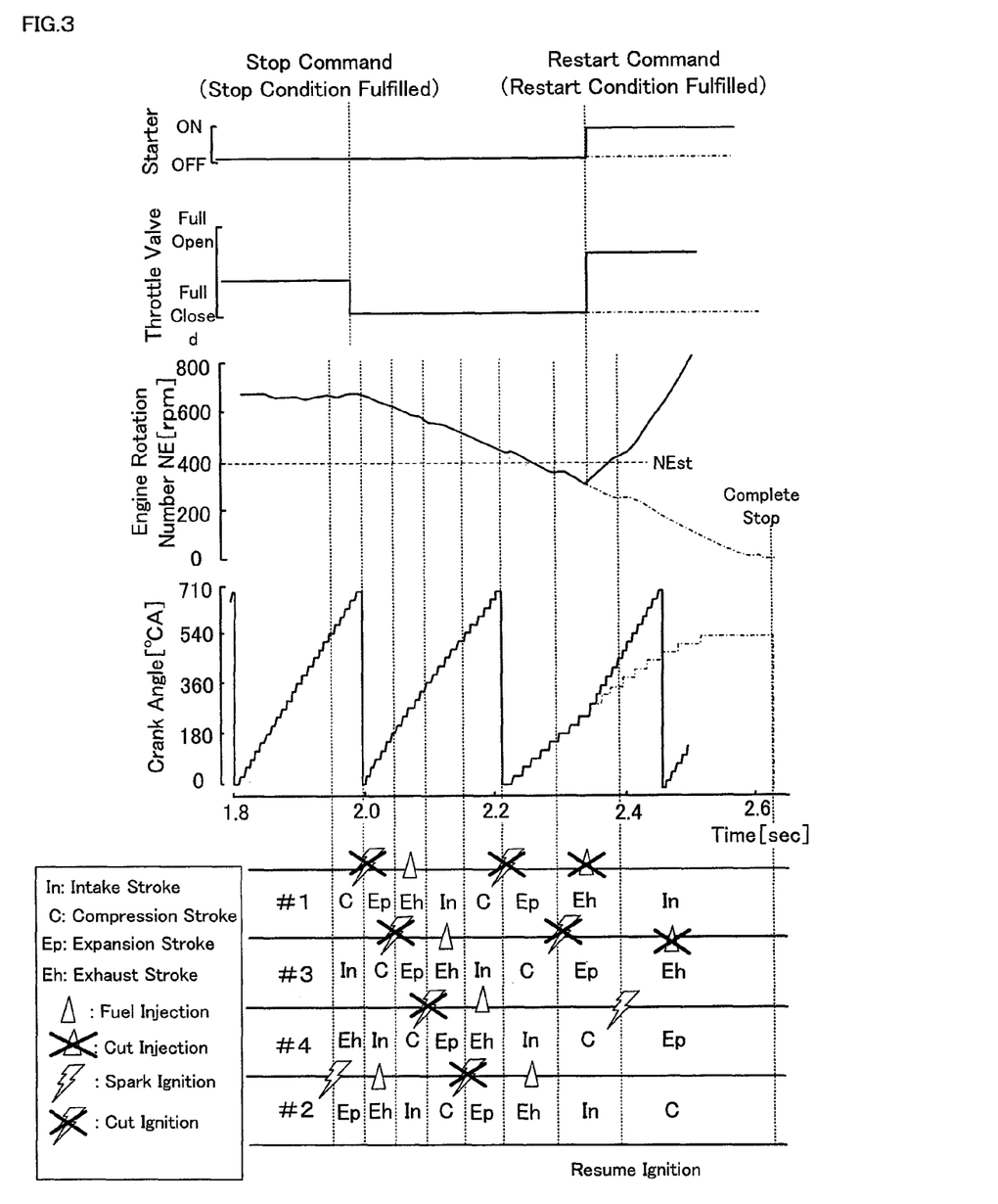
FIG. 3 is a timing chart showing another example of controlled result according to the embodiment of the present invention.

FIG. 3 is a timing chart showing another example of controlled results according to the embodiment. This example shows a case that the timing of a restart command comes later than that in the case of FIG. 2. When no restart command is made in a stop process, the timing is same as that in FIG. 2. The status prior to the restart command is also same as that in FIG. 2. In the example of FIG. 3, the engine rotation number NE at the time of the restart command is at or lower than the threshold NEst. Thus, the starter 15 is in operation immediately after the restart command is made. At the same time, the opening of the throttle valve 12 is also controlled to an opening side, so that amount of supplied air is increased. Thereafter, spark ignition is resumed at a cylinder 2 which is in compression stroke at a time of the stop command (the cylinder #4, in this example). In this case, torque required for restart can be retained with the assist of the starter 15. Thus, the engine rotation number NE rises as shown by a solid line and a restart goes well.

Figure 4:
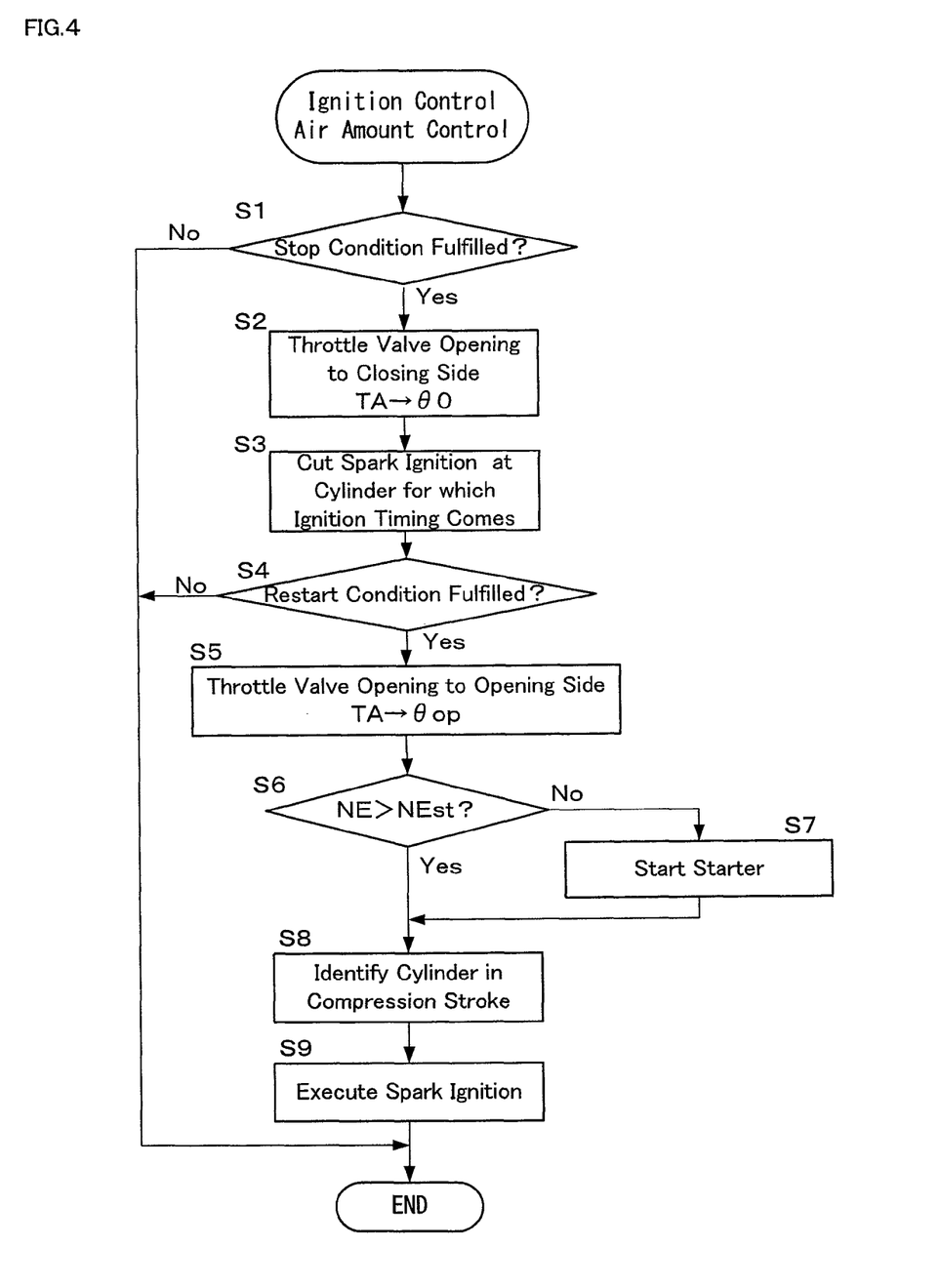
FIG. 4 is a flowchart showing an example of control routine for ignition control and air amount control with regard to idling stop control.
Figure 5:
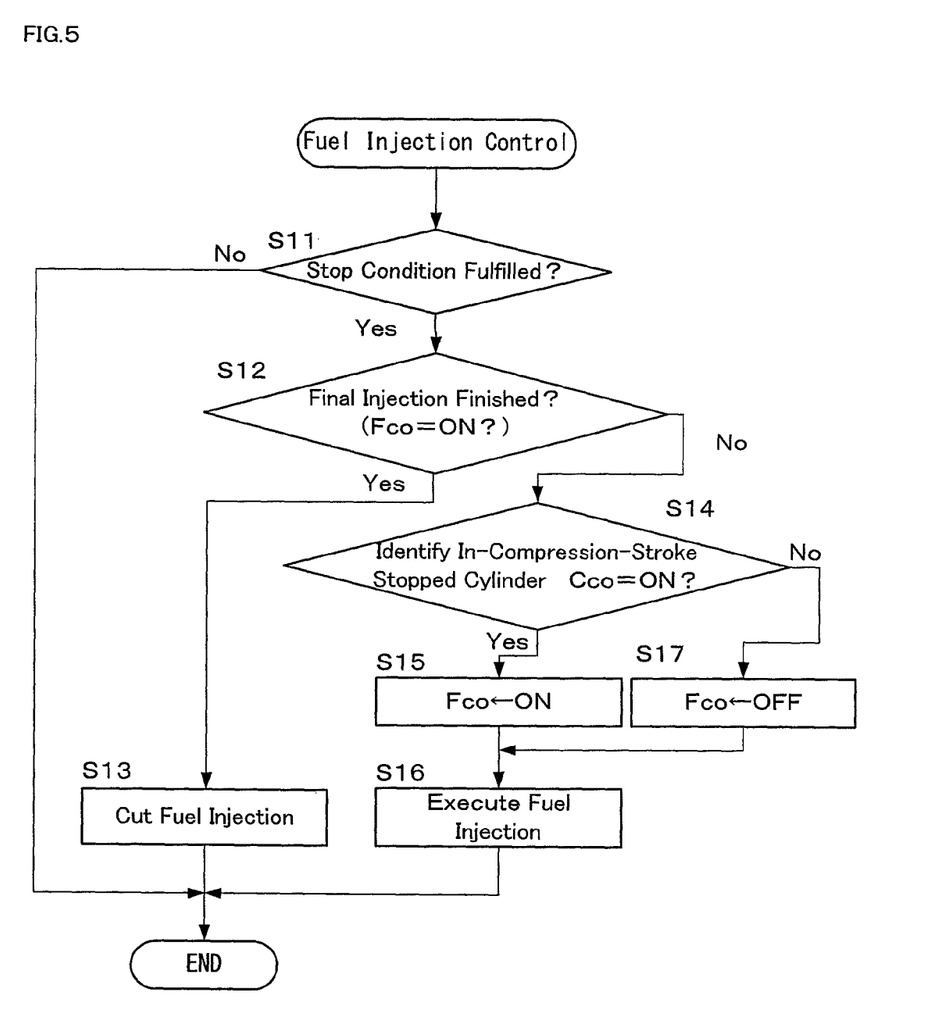
FIG. 5 is a flowchart showing an example of control routine for fuel injection control with regard to idling stop control.
Figure 6:
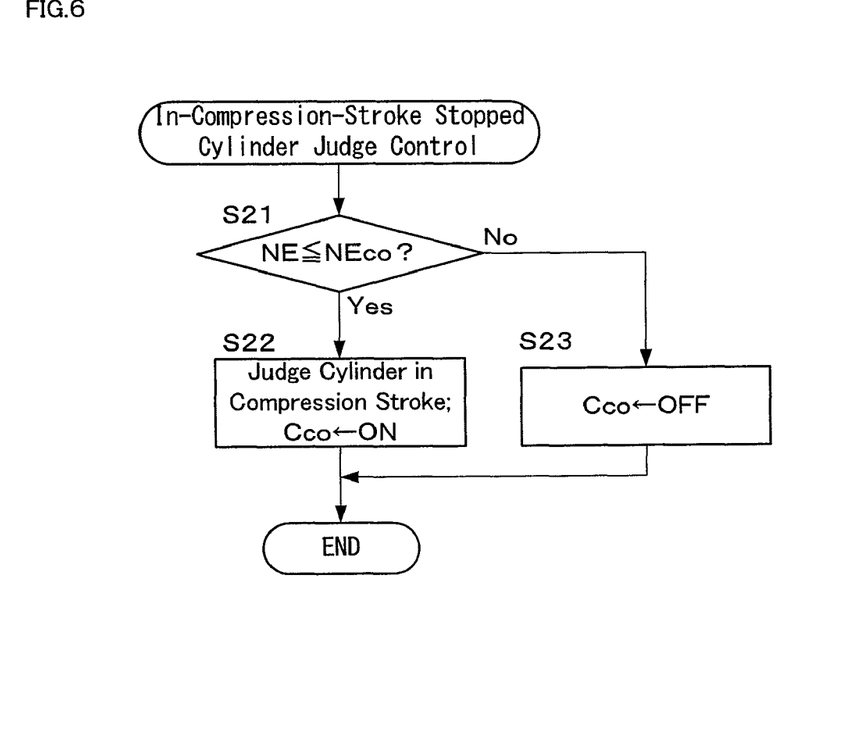
FIG. 6 is a flowchart showing an example of control routine for in-compression-stroke stopped cylinder judge control.

Next, a specific procedure of processes for realizing the above controls will be described along with flowcharts. FIGS. 4 to 6 are flowcharts showing examples of control routines executed by ECU 20, and these routines are executed concurrently with each other. The program for each control routine is retained by ECU 20, read out timely, and executed repeatedly at every prescribed crank angle. FIG. 4 shows an example of control routine for ignition control and air amount control with regard to idling stop control. First at the step S1, ECU 20 determines whether or not a stop condition is fulfilled, namely, whether or not a stop command is outputted. The determination can be done, for example, by allocating a flag for managing existence or non-existence of a stop command in the RAM of ECU 20, and referring to a state of the flag. When the stop condition has not been fulfilled, ECU 20 skips subsequent processes and ends the current routine. In the case that the stop condition is fulfilled, the process advances to the step S2, and ECU 20 controls the opening TA of the throttle valve 12 to a closing side. Here, an opening θ0 on the closing side is set to an opening θ0, at which less amount of air is achieved than the amount of air in an idling operation. For example, TA is set to a nearly full-closed condition (TA 4←θ0). Namely, assuming that the opening is θidl in an idling operation, θ0≦θidl is established.

Next at the step S3, ECU 20 cuts spark ignition at a cylinder 2 for which an ignition timing comes just after the execution of the above process. Next at the step S4, ECU 20 determines whether or not the restart condition has been fulfilled, namely whether or not a restart command was outputted. The determination is done in a similar manner as at the step S1, for example, by allocating a flag for managing existence or non-existence of a restart command in the RAM of ECU 20, and referring to a state of the flag. When the restart condition has not been fulfilled, ECU 20 skips subsequent processes and ends the current routine. When the restart condition has been fulfilled, the process advances to the step S5, ECU 20 controls the opening TA of the throttle valve 12 to an opening side. Here, an opening θop on the opening side is set appropriately to an opening at which equal or more amount of air can be obtained than the amount of air in an idling operation. Namely, θop≧θidl is established.

Next at the step S6, ECU 20 determines whether or not the engine rotation number NE exceeds the threshold NEst. The engine rotation number NE is calculated on the basis of the output of the crank-angle sensor 21. As described above, the threshold NEst means the upper limit of the rotation number over which it gets hard to restart the engine only through spark ignition, in other words, it means the upper limit of rotation number, over which an assist of the starter 15 is required, and can be predetermined experimentally. The threshold NEst may be set to a constant (ex. 400 rpm), or may be as a variable varying in accordance with circumstances. When the engine rotation number NE is at or lower than the threshold NEst, the assist of the starter 15 is required, and thus the process advances to the step S7, and ECU 20 makes the starter 15 start. On the other hand, when the engine rotation number NE exceeds the threshold NEst, no assist of the starter 15 is required, and thus the process advances to the step S8, and ECU 20 identifies a cylinder 2 which is currently in compression stroke. At the subsequent step S9, spark ignition is executed at the cylinder 2 identified in compression stroke. Then, ECU 20 ends the current routine.

FIG. 5 shows an example of control routine for fuel injection control with regard to idling stop control. First at the step S11, ECU 20 judges whether a stop condition has been fulfilled. When the stop condition has been fulfilled, the process advances to the step S12; otherwise, ECU 20 skips the subsequent processes and ends the current routine. At the step S12, ECU 20 judges whether fuel injection into a cylinder in which the piston 3 stops in compression stroke (in-compression-stroke stopped cylinder). The judgment is done on the basis of a state of a final injection flag Fco provided for managing a finish of fuel injection (final injection). The flag Fco is set to ON when the final injection is finished and otherwise is set to OFF. When the final injection is finished, namely, when the flag Fco is ON, the process advances to the step S13, and ECU 20 cuts the subsequent fuel injection and ends the current routine. On the other hand, when the final injection is not finished, the process advances to the step S14, and ECU 20 determines whether or not the cylinder for which fuel injection timing comes is an in-compression-stroke stopped cylinder. The identification is done on the basis of the state of a stop cylinder determination flag Cco, which is set to ON/OFF in the control routine shown in FIG. 6.

Figure 7:
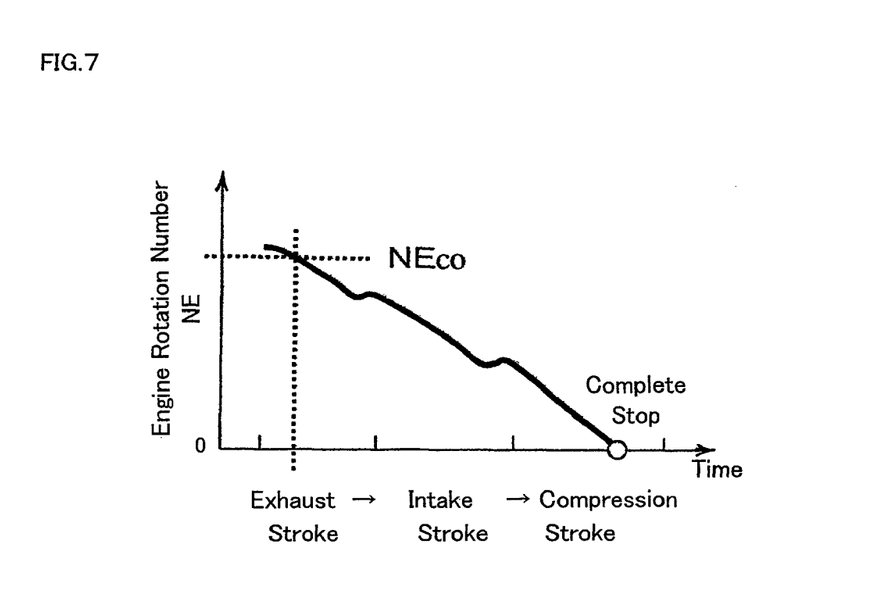
FIG. 7 is a view illustrating a prescribed value NEco used for identifying a cylinder stopped in compression stroke.

FIG. 6 shows an example of control routine for in-compression-stroke stopped cylinder judge control. First at the step S21, ECU 20 determines whether or not the engine rotation number NE is at or lower than a prescribed value NEco. FIG. 7 is a view illustrating the prescribed value NEco used for identifying a cylinder stopped in compression stroke. As shown in the figure, a specific value of the prescribed value NEco is set on the basis of an experimental fact, that the cylinder which is in exhaust stroke when the engine rotation number NE is at the prescribed value NEco will then come to a complete stop in compression stroke. Namely, the cylinder which is in exhaust stroke when the engine rotation number is at the prescribed value NEco corresponds to an in-compression-stroke stopped cylinder. Thus, when it is determined at the step S21 that the engine rotation number NE is at or lower than the prescribed value NEco, the process advances to the step S22, and ECU 20 identifies the cylinder in exhaust stroke as the in-compression-stroke stopped cylinder, and sets the stop cylinder determination flag Cco to ON (Cco←ON). Thereafter, ECU 20 ends the current routine. As well known, the stroke of each cylinder 2 is identified from the output of the crank-angle sensor 21. On the other hand, in a case that the engine rotation number NE exceeds the prescribed value, it is not a time when an in-compression-stroke stopped cylinder can be identified, and thus the process advances to the step S23, and ECU 20 sets the stop cylinder determination flag Cco to OFF (Cco←OFF), and ends the current routine.

Return to FIG. 5, when the stop cylinder determination flag Cco is ON at the step S14, the process advances to the step S15, and ECU 20 sets the final injection flag Fco to ON (Fco←ON), and then executes fuel injection for the cylinder in compression stroke at the step S16, and ends the current routine. On the other hand, when the stop cylinder determination flag Cco is not ON, the process advances to the step S17, and ECU 20 sets the final injection flag Fco to OFF (Fco←OFF), and then executes fuel injection at the step S16, and ends the current routine.

Results shown in FIG. 2 and FIG. 3 can be obtained by executing the above control routines shown in FIGS. 4 to 6. Namely, regardless of fulfillment or non-fulfillment of a restart condition, fuel supply is done in a state that spark ignition is cut after the fulfillment of a stop condition. Thus, in a case that a restart condition is fulfilled after the fulfillment of a stop condition and in a stop process prior to a complete stop, a restart can be done promptly after the fulfillment of a restart condition by resuming spark ignition without supplying fuel, thereby to making fuel ignited and combusted. It is less likely to miss a chance of restart in the control of the embodiment than a case when fuel supply is done after the fulfillment of a restart condition and then is ignited and combusted. Thus, the success possibility of restart in a case that a restart condition is fulfilled in a stop process of the internal combustion engine 1 can be improved.

In the above embodiment, ECU 20 functions as a stop control device according to the present invention by executing the control routines of FIGS. 4 to 6, functions as a restart control device according to the present invention by executing the steps S4 to 9 in FIG. 4, and functions as a throttle valve control device according to the present invention by executing the step S2 and the step S5 in FIG. 4, respectively.

However, the present invention is not limited to the above embodiment, and can be embodied in various forms. The internal combustion engine, to which the stop-start control apparatus of the present invention is applied, is not limited to a port injection type internal combustion engine. The control apparatus can be applied to a so-called direct injection type internal combustion engine, in which fuel is injected directly into a cylinder. In the case that the control apparatus is applied to a direct injection internal combustion engine, it is less restricted in the timing at which fuel supply can be done after the fulfillment of a stop condition than a port injection type internal combustion engine. Thus, the control apparatus has an advantage of having higher flexibility in the timing of fuel supply.

Moreover, it is illustrative only that fuel supply is carried on up to a cylinder stopped in compression stroke after the fulfillment of a stop condition. For example, in a case that the internal combustion engine, to which the present invention is applied, is configured to start spark ignition at a cylinder in expansion stroke at the restart after a complete stop, fuel supply may be carried on up to a cylinder stopped in expansion stroke, which stops in expansion stroke at a complete stop. The identification of a cylinder stopped in expansion stroke can be done in a similar method shown in FIG. 7.

Moreover, the means for reducing or increasing amount of supplied air in a stop process of an internal combustion engine is not limited to a form of controlling the opening of a throttle valve. For example, amount of supplied air can be reduced or increased by controlling open and close timings of an intake valve, which is provided for each cylinder. Namely, amount of supplied air may be reduced by retarding a closing timing of an intake valve, or amount of supplied air may be increased by advancing the closing timing of the intake valve. Furthermore, amount of supplied air can be also reduced or increased by employing the opening control of throttle valve and the open and close timing control of intake valve together.

The invention claimed is:

1. A stop-start control apparatus for an internal combustion engine applied to a spark ignition internal combustion engine, wherein the stop-start control apparatus stops the internal combustion engine in a case that a prescribed stop condition is fulfilled, and restarts the internal combustion engine in a case that a prescribed restart condition is fulfilled, the stop-start control apparatus comprising:
    a stop control device which cuts spark ignition for the internal combustion engine in response to the fulfillment of the stop condition, and carries on fuel supply to the internal combustion engine; and
    a restart control device which resumes spark ignition for the internal combustion engine in such a manner that fuel burns which is supplied after the fulfillment of the stop condition, in a case that a restart condition is fulfilled after the fulfillment of the stop condition and prior to a complete stop of the internal combustion engine.

2. The stop-start control apparatus for an internal combustion engine according to claim 1, wherein
    the internal combustion engine is provided with a starter employing a motor as a drive source, and
    while keeping the starter to operate, the restart control device resumes spark ignition for the internal combustion engine, in a case that an engine rotation number of the internal combustion engine at a time when the restart condition is fulfilled after the fulfillment of the stop condition and prior to a complete stop of the internal combustion engine is at or lower than a prescribed value.

3. The stop-start control apparatus for an internal combustion engine according to claim 1, wherein
    the internal combustion engine is configured as a four stroke cycle engine including a plurality of cylinders, and is configured to start spark ignition at a cylinder stopped in a prescribed stroke, in restarting the internal combustion engine after it has comes to a complete stop, and
    the stop control device identifies a cylinder stopped in the prescribed stroke from among the plurality of cylinders, carries on fuel supply up to the identified cylinder from a time when the stop condition is fulfilled, and cuts subsequent fuel supply until a complete stop of the internal combustion engine.

4. The stop-start control apparatus for an internal combustion engine according to claim 1, wherein
    the internal combustion engine is configured as a four stroke cycle engine including a plurality of cylinders, and
    the restart control device resumes spark ignition at a cylinder which is in compression stroke at a time when the restart condition is fulfilled, in a case that the restart condition is fulfilled after the fulfillment of the stop condition and prior to a complete stop of the internal combustion engine.

5. The stop-start control apparatus for an internal combustion engine according to claim 1, wherein
    the internal combustion engine is provided with a throttle valve capable of regulating amount of air supplied to the internal combustion engine by varying opening thereof, and
    the stop-start control apparatus further comprises a throttle valve control device which controls an opening of the throttle valve to an opening side in such a manner that amount of supplied air is increased more than that prior to the fulfillment of the restart condition, in a case that the restart condition is fulfilled after the fulfillment of the stop condition and prior to a complete stop of the internal combustion engine.

6. The stop-start control apparatus for an internal combustion engine according to claim 5, wherein the throttle valve control device controls an opening of the throttle valve to a closing side in such a manner that amount of supplied air is reduced less than that prior to the fulfillment thereof, in a case that the stop condition is fulfilled.

* * * * *